United States Patent [19]

Sugimoto et al.

[11] Patent Number: 4,547,670

[45] Date of Patent: Oct. 15, 1985

[54] TWO-DIMENSIONAL RADIATION DETECTING APPARATUS

[75] Inventors: Hiroshi Sugimoto, Tochigi; Yujiro Naruse, Yokohama, both of Japan

[73] Assignee: Tokyo Shibaura Denki Kabushiki Kaisha, Tokyo, Japan

[21] Appl. No.: 486,514

[22] Filed: Apr. 19, 1983

[30] Foreign Application Priority Data

Apr. 20, 1982 [JP] Japan ................... 57-64685

[51] Int. Cl.$^4$ .................. G01T 1/24; H01L 31/02
[52] U.S. Cl. ................... 250/370; 250/327.2; 250/361 R
[58] Field of Search ............ 250/370 J, 370 I, 370 H, 250/370 G, 327.2, 315.3, 484.1

[56] References Cited

U.S. PATENT DOCUMENTS

| 2,990,473 | 6/1961 | Kallman | 250/315.3 |
| 3,859,527 | 1/1975 | Luckey | 250/327.2 |
| 3,974,389 | 8/1976 | Ferri et al. | 250/483.1 |
| 4,079,255 | 3/1978 | Brueckner et al. | 378/29 |
| 4,249,106 | 2/1981 | Maruyama et al. | 313/365 |
| 4,258,264 | 3/1981 | Kotera et al. | 250/484.1 |
| 4,302,671 | 11/1981 | Kato et al. | 250/327.2 |
| 4,369,369 | 1/1983 | Heidrich et al. | 250/484.1 |

FOREIGN PATENT DOCUMENTS 56-11395 2/1981 Japan .
2037077 12/1979 United Kingdom .

Primary Examiner—Alfred E. Smith
Assistant Examiner—Constantine Hannaher
Attorney, Agent, or Firm—Cushman, Darby & Cushman

[57] ABSTRACT

A two-dimensional X-ray detecting apparatus is comprised of an amorphous silicon layer for trapping electrons in a pattern corresponding to an intensity distribution when it is receiving X-rays, and a scanning device for scanning the surface of the amorphous silicon layer with a laser beam to take out electrons trapped in the silicon layer.

11 Claims, 5 Drawing Figures

TWO-DIMENSIONAL RADIATION DETECTING APPARATUS

BACKGROUND OF THE INVENTION

The present invention relates to a two-dimensional radiation detecting apparatus for two-dimensionally detecting radiation such as X-rays.

FIG. 1 illustrates an example of a conventional two-dimensional radiation detecting apparatus which is applied for detecting X-rays. In the figure, reference numeral 1 designates an X-ray tube, 2 an object under diagnosis, 3 a scintillator, 4 a light detector. The scintillator 3 and the light detector 4 cooperate to form a two-dimensional X-ray detecting apparatus. The scintillator is made of material such as NaI(Tl), CaF$_2$, CsI(Tl), CsF, BaF$_2$, Bi$_4$Ge$_3$O$_{12}$, CaWO$_4$, and CdWO$_4$. X-rays radiated from the X-ray tube 1 are applied to the scintillator 3 through the object 2. When the scintillator 3 is irradiated with X-rays, it interacts with the X-rays and emits fluorescence or phosphorescence. The color of the light emitted is determined by material of the scintillator 3. An electrical signal representing the detected light is applied to a data processor 5 where it is converted into a video signal. The video signal is then input to a display 6 which then displays an image representing the object on the screen.

In the two-dimensional radiation detecting apparatus as shown in FIG. 1, the size of the two-dimensional light detector 4 must be equal to that of the scintillator 3 covering a radiographing area. This results in an increase in manufacturing cost of the apparatus. Further, the spatial resolution of the image obtained depends on the performance of the light detector 4.

SUMMARY OF THE INVENTION

Accordingly, an object of the present invention is to provide a two-dimensional radiation detecting apparatus which may detect an intensity distribution of radiation with a high spatial resolution, and low manufacturing cost.

According to the present invention, there is provided a two-dimensional X-ray detecting apparatus comprising:

a substrate;
two-dimensional radiation detecting means containing
  an electron trapping layer laminated on said substrate and made of material to trap the number of electrons proportional to an amount of radiation in a trap level in a forbidden band when said trapping layer is irradiated, and an electrode layer laminated on said electron trapping layer;
biasing means for reverse-biasing said electron trapping layer with respect to a reference potential; and
scanning means for scanning said electron trapping layer to take out said trapped electrons from said electron trapping layer into said electrode layer.

DETAILED DESCRIPTION OF THE PREFERRED EMBODIMENTS

Figure 1:
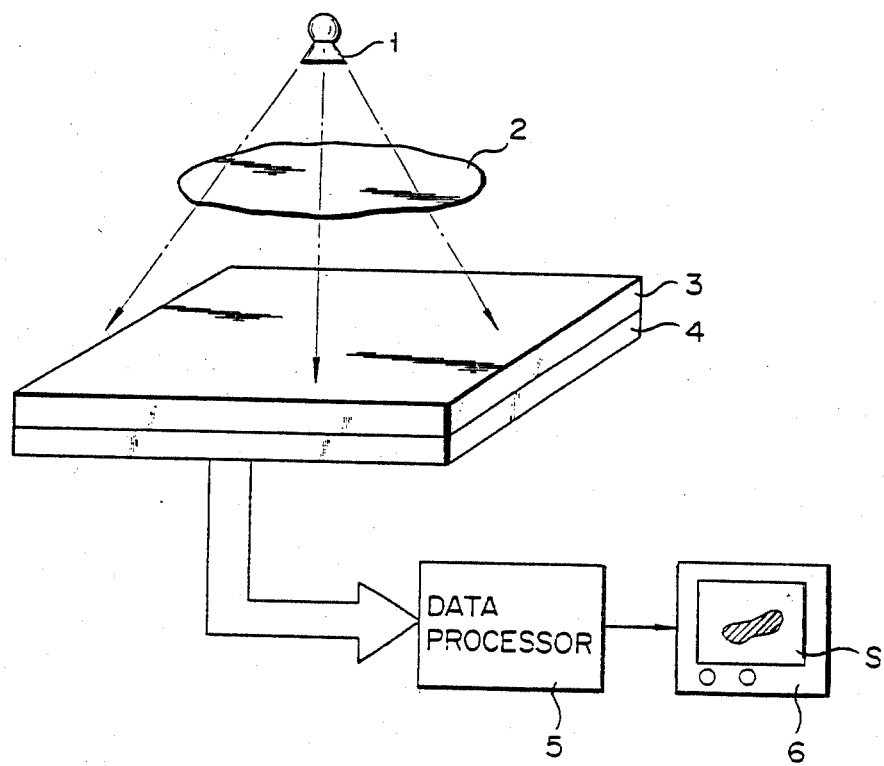
FIG. 1 shows, in schematic and block form, a conventional two-dimensional X-ray detecting apparatus which is applied for X-ray detection.
Figure 2:
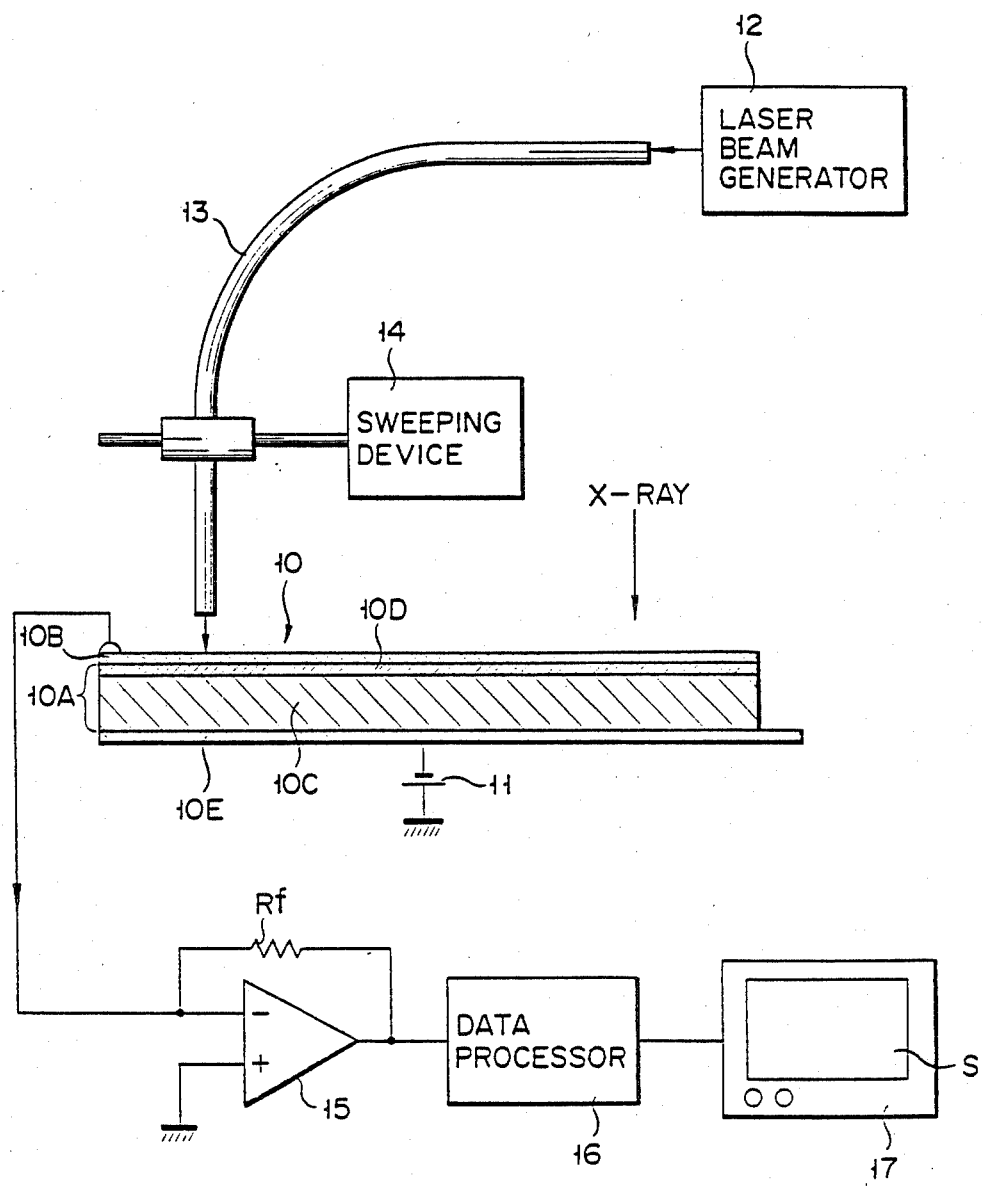
FIG. 2 shows, in schematic and block form, a two-dimensional X-ray detecting apparatus according to the invention which is applied for detecting X-rays.

Reference is made to FIG. 2 illustrating a two-dimensional X-ray detecting apparatus according to the invention which is applied for X-rays, for example.

In FIG. 2, reference numeral 10 designates an image plate of a two-dimensional X-ray detecting device. The image plate 10 is comprised of a substrate 10E, a layer 10A and a transparent electrode layer 10B. The substrate 10E, made of stainless steel, for example, is reverse-biased with respect to a reference potential (ground potential in this embodiment). The layer 10A is layered over the substrate 10E, and made of material to trap electrons proportional to an amount of radiation, for example, radiated X-rays, in a trap level in the forbidden band. This layer 10A is called an electron trapping layer. The transparent electrode layer 10B is laid over the layer 10A and made of transparent conductive material such as In$_2$O$_3$-SnO$_2$, for taking out electrical signals representing a distribution of electrons trapped. The image plate 10 thus structured is disposed in opposition to an X-ray tube 8 (see FIG. 3) with an object under diagnosis interposed therebetween. In this case, the electrode layer 10B is used as a radiation receiving layer. When the electron trapping layer 10A is made of amorphous silicon, and the electrode plate 10B is made of In$_2$O$_3$-SnO$_2$, the electron trapping layer 10A preferably takes a double layered structure which is composed of a first amorphous silicon layer 10C layered on the substrate 10E and containing hydrogen of approximately 5% and a second amorphous silicon layer 10D layered on the electrode layer 10B and containing hydrogen of approximately 30%. These layers 10C, 10D and 10B on the substrate 10E may easily be formed by, for example, the glow discharge method, sputtering method, and resistor-heating method. Numeral 12 designates a device for generating laser rays with a wavelength of 4000 Å to 7000 Å, and this device may be, for example, an He-Ne laser generator for generating laser rays with a wavelength of 6328 Å. An optical fiber 13 is connected to the laser beam generator 12 and guides the laser rays generated by the laser beam generator 12 onto the electrode layer 10B of the image plate 10. It is preferable that the spot of the laser rays emitted from the optical fiber 13 be as small as possible for improving a resolution of the image formed. The optical fiber 13 is provided with a sweeping device 14 for driving the optical fiber 13 so that the light emitted from the optical fiber 13 scans the surface of the electrode layer 10B in a predetermined pattern. The electrode layer 10B is connected to the inverting input terminal (−) of a current amplifier 15 through a signal line. The other input terminal of the current amplifier 15 is connected to ground. The current amplifier 15 amplifies a signal coming through a signal line from the image plate 10. A feedback resistor Rf is inserted between the inverting terminal (−) and the output terminal of the amplifier 15. The signal amplified by the amplifier 15 is input to a data processor 16. In the data processor 16, the input signal is subjected to an A/D conversion, filtering, and level conversion, and transformed into a video signal. The video signal from the data processor 16 is input to the display 17 where an image corresponding to an object is displayed on the CRT screen.

The operation of the embodiment shown in FIG. 2 will be described.

Figure 3:
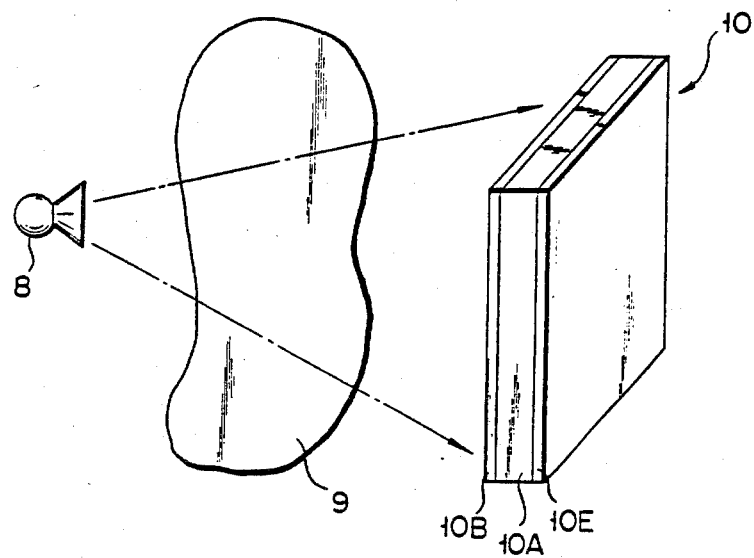
FIG. 3 shows a schematic diagram of an arrangement in which the two-dimensional X-ray detecting apparatus according to the invention and an X-ray tube are disposed with an object under diagnosis interposed therebetween.
Figure 4:
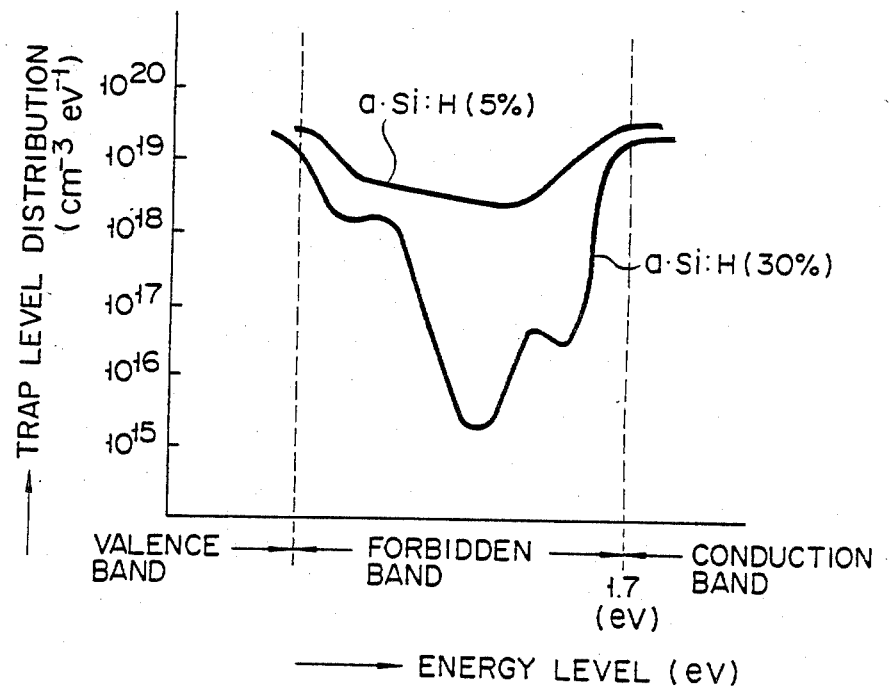
FIG. 4 illustrates curves representing a trap level distribution of amorphous silicon with respect to energy levels.

X-rays are radiated from the X-ray tube 8 and transmitted through the object 9, and is received at the transparent electrode 10B of the image plate 10 as shown in FIG. 3. When the X-ray is projected to the image plate 10, the electrons are excited in the first amorphous silicon layer 10C. As shown by the characteristic curve of FIG. 4, the amorphous silicon containing 5% hydrogen has a high trap level distribution in the forbidden band of energy level. Accordingly, electrons transferred to the conduction band are trapped in the trap level. The number of electrons trapped corresponds to the amount of irradiation of X-rays at individual locations. A pattern of electrons trapped corresponds to that of an intensity distribution of X-rays projected to the image plate 10. The first amorphous silicon 10C layer is reverse-biased by a biasing power supply 11 through the substrate 10E. At the same time, the laser beam generator 12 and the sweeping device 14 are driven to move the optical fiber 13 in a predetermined motion pattern. With this movement, the electrode layer 10B is scanned on the surface by the laser beam generated from the laser beam generator 12. With this irradiation of the laser beam, the electrons trapped in the first amorphous silicon layer 10C are excited by the optical energy of the laser beam. Further, with the reverse-bias, the electrons are moved to the second amorphous silicon layer 10D with a lower trap level. The electrons moved are taken out through the electrode 10B from the image plate 10 and are input as a current signal to the current amplifier 15 via the signal line. The signal amplified is input to the data processor 16 where it is A/D converted and level-converted, and which then produces a video signal corresponding to an electron pattern of electrons stored in the first amorphous silicon layer 10C, that is to say, an image of the object. The video signal from the data processor 16 is input to the display 17 where an image corresponding to the object is displayed on the screen.

The above-mentioned embodiment employs a method for scanning the image plate using an optical fiber and its sweeping device. Alternatively, a laser beam deflection circuit is provided in the laser beam generator, and the laser beam is deflected using the deflection circuit, thereby scanning the laser beam. The electrons trapped in the trap level are excited by the optical array, but this may be effected by thermal energy. In this case, a thermal energy source may be a YAG laser, $CO_2$ laser, heat stream, or the like. In this case, the thermal energy must be at an energy level higher than the maximum energy level in the forbidden band of the electron trap material layer to excite the electrons. For example, when the amorphous silicon layer is used for the electron trap material layer, as in the above-mentioned embodiment, the maximum energy level in the forbidden band is 1.7 eV and therefore the heat energy level must be at least 1.7 eV or more. In the above-mentioned embodiment, the amorphous silicon may be replaced by material capable of trapping electrons in the trap level in the forbidden band, such as amorphous CdTe, amorphous CdS, or the like.

Figure 5:
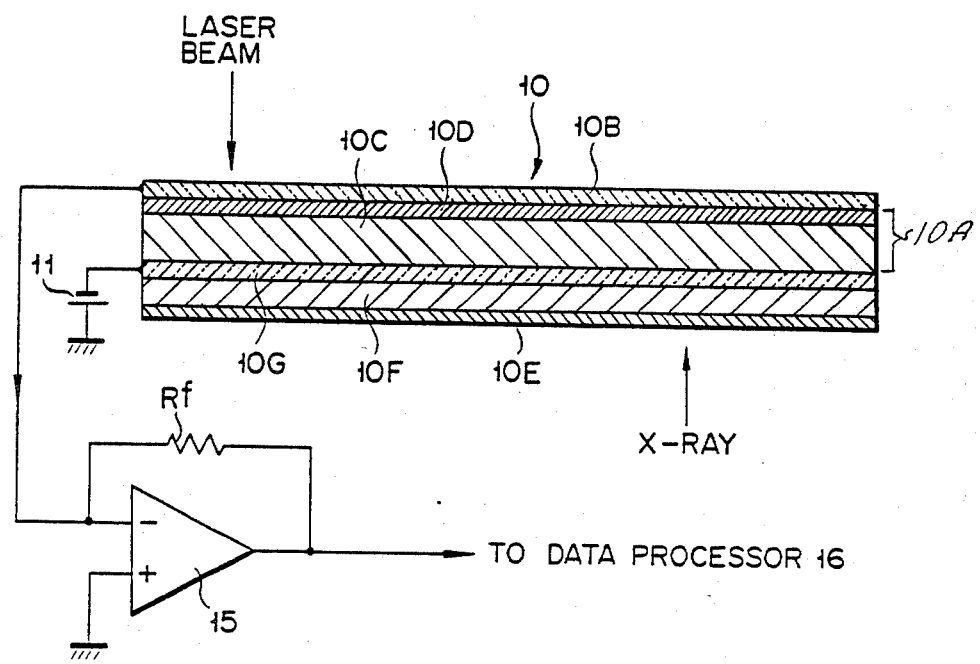
FIG. 5 shows, in schematic and block form, another embodiment of a two-dimensional X-ray detecting apparatus according to the invention.

Another structure of the image plate 10 is illustrated in FIG. 5. In the image plate shown in FIG. 5, equivalent portions are designated by like numerals in FIG. 2. In the image plate shown in FIG. 5, a multilayer of a scintillator plate 10F and a biasing electrode layer 10G is interposed between the substrate 10E and the amorphous layer 10A. The scintillator plate 10F is layered on the substrate 10E and the biasing electrode layer 10G is inserted between the scintillator plate 10F and the amorphous layer 10A. The biasing power source 11 is connected to the biasing electrode 10G, not to the substrate 10E, as in the case of FIG. 2. The biasing electrode is reverse-biased. In the image plate with such a construction, unlike the case of FIG. 2, the substrate 10E is irradiated. As for the read out of the charges stored in the image plate 10, however, the laser beam for read out is used for illuminating the electrode layer 10B of the image plate 10. In the case of FIG. 5, a radiation collecting efficiency may be improved with the action of the scintillator plate 10F. The substrate 10E is preferably carbon fiber reinforced plastics (CFRP), in order to improve the X-ray transmission characteristic.

As described above, in the two dimensional radiation detecting apparatus according to the present invention, a layer with material capable of trapping electrons is used. This layer is irradiated with radiation transmitted through an object under diagnosis. The layer traps electrons in a pattern according to a radiation intensity distribution. Afterwards, the trapped electrons are taken out to detect an intensity distribution of radiation. This eliminates the need of detecting radiation during the irradiation of radiation. Therefore, the data processing burden of the data processor is greatly lightened. A scanning system is employed for taking out the trapped electrons. Therefore, there is no need for a large size two-dimensional light detector, which has been required. Further, with reduction of a spot diameter of the scanning beam, a spatial resolution can easily be improved. Whereas in the conventional X-ray diagnostic apparatus using an X-ray film, a spatial resolution of an X-ray image depends solely on the sensitivity of the X-ray film or the X-ray sensitized paper, an X-ray diagnosis apparatus incorporating a detection apparatus according to the present invention can adjust a spatial resolution by changing the spot diameter of the scanning beam. With this feature, the spatial resolution can be set to a proper value according to the diagnostic portion or object of the diagnosis. In the case of the X-ray film, a tolerable range of an amount of exposure is narrow. Therefore, it is frequently required to adjust the amount of X-ray radiation by detecting the intensity of X-rays during the radiation of X-rays. On the other hand, in the X-ray diagnosis apparatus according to the present invention, the tolerable range of the exposure amount is wide and therefore there is no need for a large amount of X-ray radiation. Further, in the conventional X-ray diagnosis apparatus using the X-ray film, a diameter of an input face of the image intensifier is small. Therefore, for radiographing a large area of the object, such as a chest, the radiographing operation must be performed a number of times. That is to say an area of the object is divided into a plurality of sections and these sections are radiographed while the input face of the image intensifier is displaced in succession. On the other hand, according to the invention, when an object with a wide area is radiographed, all one has to do is to select the image plate with an area wide enough to cover the wide object. Thus, according to the present invention, the amount of X-ray radiation can considerably be reduced, thereby reducing the danger to the patient.

Having described a specific embodiment of our invention, it is believed obvious that modification and variation is possible in light of the above teachings.

What we claim is:

1. A two-dimensional X-ray detecting apparatus comprising:

a substrate;

two-dimensional radiation detecting means containing an electron trapping layer laminated on said substrate and made of material to trap the number of electrons proportional to an amount of radiation in a trap level in a forbidden band when said trapping layer is irradiated, and an electrode layer laminated on said electron trapping layer;

biasing means for reverse-biasing said electron trapping layer with respect to a reference potential; and scanning means for scanning said electron trapping layer to take out said trapped electrons from said electron trapping layer into said electrode layer.

2. A two-dimensional X-ray detecting apparatus according to claim 1, wherein said two-dimensional radiation detecting means is further provided with a laminated member containing a scintillator and a biasing electrode layer and layered between said substrate and said electron trapping layer, said scintillator being layered on said substrate and said biasing electrode layer being layered on said scintillator.

3. A two-dimensional X-ray detecting apparatus according to claim 2, wherein said scintillator is made of $CdWO_4$ and said substrate is made of plastic.

4. A two-dimensional X-ray detecting apparatus according to claim 2, wherein said substrate is made of carbon fiber reinforced plastics.

5. A two-dimensional X-ray detecting apparatus according to claim 1, wherein said electron trapping layer is selected from one of amorphous Si, amorphous CdTe, amorphous GaAs and amorphous Cds.

6. A two-dimensional X-ray detecting apparatus according to claim 1, wherein said electrode layer is made of $In_2O_3$-$SnO_2$.

7. A two-dimensional X-ray detecting apparatus according to claim 1, wherein said electrode layer is made of $In_2O_3$-$SnO_2$ layer and said electron trapping layer is a laminated member composed of a first amorphous silicon layer layered on said substrate and containing approximately 5% hydrogen and a second amorphous silicon layer layered on said $In_2O_3$-$SnO_2$ electrode layer and containing approximately 30% hydrogen.

8. A two-dimensional X-ray detecting apparatus according to claim 1, wherein said scanning means includes beam generating a means for generating beam to illuminate the surface of said electron trapping layer, guide means for guiding the beam from said beam generating means onto said trapping layer, and sweeping means for moving said guide means along a predetermined scanning pattern, thereby to scan the surface of said electron trapping layer with said beam.

9. A two-dimensional X-ray detecting apparatus according to claim 8, wherein said beam generating means is a laser beam generator.

10. A two-dimensional X-ray detecting apparatus according to claim 9, wherein said laser beam generator is one of a He-Ne laser beam generator, a YAG laser beam generator, and $CO_2$ laser beam generator.

11. A two-dimensional X-ray detecting apparatus according to claim 1, wherein said substrate is made of stainless steel.

* * * * *

UNITED STATES PATENT AND TRADEMARK OFFICE
CERTIFICATE OF CORRECTION

PATENT NO. : 4,547,670
DATED : October 15, 1985
INVENTOR(S) : Hiroshi Sugimoto, Yujiro Naruse It is certified that error appears in the above-identified patent and that said Letters Patent is hereby corrected as shown below:

ON THE FIRST INFORMATION PAGE:

Change "[73] Assignee: Tokyo Shibaura Denki Kabushiki Kaisha, Tokyo, Japan" to --[73] Assignee: Tokyo Shibaura Denki Kabushiki Kaisha, Kawasaki, Japan--.

Signed and Sealed this

Twenty-seventh Day of May 1986

[SEAL]

Attest:

DONALD J. QUIGG

Attesting Officer

Commissioner of Patents and Trademarks